(12) United States Patent
Wessel

(10) Patent No.: US 11,631,425 B1
(45) Date of Patent: Apr. 18, 2023

(54) MAGNETIC STORAGE WRITER WITH NON-UNIFORM COIL THICKNESS

(71) Applicant: Seagate Technology LLC, Freemont, CA (US)

(72) Inventor: James Wessel, Savage, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/576,587

(22) Filed: Jan. 14, 2022

(51) Int. Cl.
*G11B 5/187* (2006.01)
*G11B 5/31* (2006.01)
*G11B 5/17* (2006.01)

(52) U.S. Cl.
CPC ............... *G11B 5/187* (2013.01); *G11B 5/17* (2013.01); *G11B 5/3109* (2013.01)

(58) Field of Classification Search
None
See application file for complete search history.

(56) References Cited

U.S. PATENT DOCUMENTS

| | | | | |
|---|---|---|---|---|
| 4,652,957 A * | 3/1987 | Schewe | ............... | G11B 5/1278 |
| 5,875,080 A * | 2/1999 | Seagle | ................... | G11B 5/313 |
| | | | | 29/603.24 |
| 6,333,830 B2 | 12/2001 | Rose et al. | | |
| 6,525,901 B1 * | 2/2003 | Kamijima | ............... | B82Y 10/00 |
| | | | | 360/123.41 |
| 6,922,311 B2 * | 7/2005 | Kobayashi | ........... | G11B 5/3136 |
| | | | | 360/123.41 |
| 7,168,156 B2 * | 1/2007 | Sasaki | .................... | G11B 5/3116 |
| | | | | 360/123.01 |
| 7,238,292 B1 * | 7/2007 | He | ........................ | G11B 5/3133 |
| | | | | 29/603.03 |
| 7,379,269 B1 * | 5/2008 | Krounbi | ............... | G11B 5/3133 |
| | | | | 360/125.01 |
| 7,764,465 B2 | 7/2010 | Morita et al. | | |
| 7,791,837 B2 | 9/2010 | Fujiwara | | |
| 8,035,920 B2 | 10/2011 | Na et al. | | |
| 8,786,983 B1 | 7/2014 | Liu et al. | | |
| 8,797,684 B1 | 8/2014 | Tran et al. | | |
| 8,810,963 B1 | 8/2014 | Sasaki et al. | | |
| 8,896,966 B2 | 11/2014 | Lee et al. | | |
| 9,070,384 B1 | 6/2015 | Kimura et al. | | |
| 9,159,340 B1 | 10/2015 | Qiu et al. | | |
| 9,697,852 B2 | 7/2017 | Xue et al. | | |
| 9,704,513 B2 | 7/2017 | Sasaki et al. | | |

(Continued)

FOREIGN PATENT DOCUMENTS

| | | | | |
|---|---|---|---|---|
| EP | 2620942 A1 * | 7/2013 | ........... | G11B 5/3113 |
| JP | 2000293818 A * | 10/2000 | ............. | B82Y 10/00 |
| JP | 3763526 B2 * | 4/2006 | ............. | B82Y 10/00 |

*Primary Examiner* — William J Klimowicz (57) ABSTRACT

A magnetic recording head includes a write pole including an end proximal to a media-facing surface of the magnetic recording head, a return pole disposed a distance from the write pole in a down-track dimension of the magnetic recording head, and a writer coil configured to produce a magnetic flux in the write pole. The writer coil includes a first segment and a second segment. The first segment is disposed proximal to the end of the write pole and between the write pole and the return pole. The second segment is electrically coupled to the first segment. A thickness of the second segment in the down-track dimension is greater than a thickness of the first segment in the down-track dimension.

20 Claims, 5 Drawing Sheets

(56) References Cited

U.S. PATENT DOCUMENTS

| | | | |
|---|---|---|---|
| 9,934,795 B1 | 4/2018 | Rivkin et al. | |
| 10,074,386 B1 | 9/2018 | Wessel et al. | |
| 10,410,659 B2 | 9/2019 | Kunkel et al. | |
| 2005/0047015 A1* | 3/2005 | Matono | G11B 5/3136 |
| 2007/0121245 A1 | 5/2007 | Kobayashi et al. | |
| 2007/0230042 A1* | 10/2007 | Fujiwara | H01L 23/5227 |
| | | | 360/123.13 |
| 2007/0230049 A1* | 10/2007 | Fujiwara | H01F 17/0013 |
| | | | 360/123.01 |
| 2009/0097158 A1* | 4/2009 | Neuhaus | G11B 5/3163 |
| | | | 360/125.02 |
| 2012/0170154 A1* | 7/2012 | Sasaki | G11B 5/4853 |
| | | | 29/603.01 |
| 2013/0155550 A1* | 6/2013 | Sasaki | G11B 5/3133 |
| | | | 360/122 |
| 2015/0154987 A1* | 6/2015 | Etoh | G11B 5/127 |
| | | | 360/123.04 |

* cited by examiner

MAGNETIC STORAGE WRITER WITH NON-UNIFORM COIL THICKNESS

TECHNICAL FIELD

The disclosure relates to a writer of a magnetic recording head for data storage.

BACKGROUND

A magnetic recording head of a hard disk drive (HDD) includes a writer. In one example, the writer includes a write pole, one or more return poles, and one or more writer coils. A writer coil may be formed around the write pole and/or around a magnetic via that connects the write pole and a return pole. Current may be passed through the writer coil to generate a magnetic field through induction. The write pole and return pole(s) may include magnetic materials with properties (e.g., high magnetic permeability, low magnetic coercivity) that enable them to guide flux of a generated magnetic field. The flux may, for example, be directed toward a surface of a magnetic disk to store data on the magnetic disk. High data rates in an HDD require smaller bits on the magnetic disk, and thus require rapid directional and magnitude switChes of the magnetic flux that is emitted from the write pole.

SUMMARY

The present disclosure describes a writer coil of a writer of a magnetic recording head. The writer coil includes a segment in close proximity to the write pole and a segment distal to the write pole. The segment proximal to the write pole is thinner than the segment distal to the write pole. Providing a thinner segment of the writer coil in close proximity to the write pole may increase the magnitude of the magnetic field that the writer coil generates in the write pole. The increased magnitude of the magnetic field in the write pole may in turn enable faster switChing of magnetization in the write pole without requiring a large overshoot current to be applied through the writer coil. Enabling faster switChing of magnetization in the write pole without applying a large overshoot current may reduce heating near the write pole and may reduce uncontrollable write-induced writer protrusion (WIWP) that may lead to data erasure, poorly written bits, varied bit size damage to the magnetic recording head, and/or other undesirable effects. Additionally, utilizing a relatively thick coil for a segment that is distal to the write pole may enable the distal segment of writer coil to dissipate heat more effectively and/or further reduce the WIWP, with relatively little or even no effect on the magnetic field generated by the write pole.

In one example, a magnetic recording head includes a write pole including an end proximal to an air-bearing surface of the magnetic recording head; a return pole disposed a distance from the write pole in a down-track dimension of the magnetic recording head; and a writer coil configured to produce a magnetic flux in the write pole, the writer coil including a first segment disposed proximal to the end of the write pole and between the write pole and the return pole; and a second segment electrically coupled to the first segment, wherein a thickness of the second segment in the down-track dimension is greater than a thickness of the first segment in the down-track dimension.

These and other features and aspects of various examples may be understood in view of the following detailed discussion and accompanying drawings.

DETAILED DESCRIPTION

Figure 1:
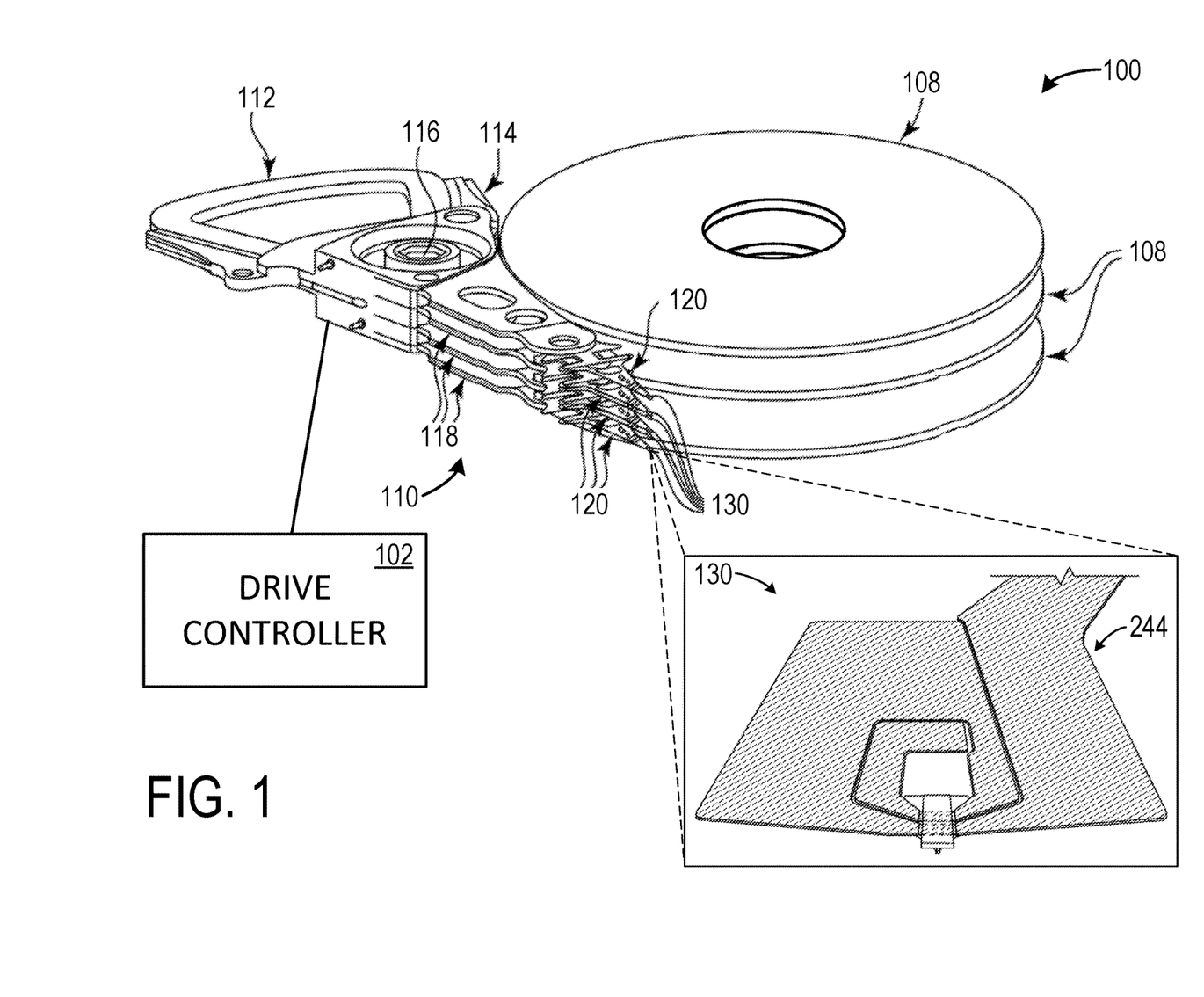
FIG. 1 is a perspective view of an example hard disk drive, in accordance with aspects of this disclosure.

FIG. 1 is a perspective view of an example hard disk drive (HDD), in accordance with aspects of this disclosure. HDD 100 includes a drive controller 102, a head stack assembly (HSA) 110, and one or more magnetic disks 108. Drive controller 102 is configured to control drive operations, such as read and write operations. In some examples, drive controller 102 receives commands (e.g., read commands and write commands) from a host device (not shown) and controls components of HDD 100 based on the commands. For example, drive controller 102 may direct a current to be passed through a writer coil 244 of a magnetic recording head 130 in response to receiving a write command. In some examples, drive controller 102 includes hardware, hardware and software, hardware and firmware, or a combination thereof. Examples of drive controller 102 include a digital signal processor (DSP), a processor or microprocessor, an application specific integrated circuit (ASIC), a field programmable gate array (FPGA), and a system on a chip (SoC), among others. While illustrated as a single controller, the functionality of drive controller 102 may in some examples be performed by a combination of controllers.

HSA 110 includes a plurality of head gimbal assemblies (HGA) 120. Each HGA 120 includes a magnetic recording head 130 configured to read data from and write data to a surface of a magnetic disk 108. In one example, a magnetic recording head 130 includes a writer, a reader, and at least one heater (e.g., a reader heater, a writer heater, or both). A magnetic recording head 130 of FIG. 1 includes a write coil 244 that is configured to carry electrical current and induce a magnetic flux. In some examples, a magnetic recording head 130 is a heat-assisted magnetic recording (HAMR) head that includes a writer, a reader, at least one heater (e.g., a reader heater, a writer heater, or both), a waveguide, and a near-field transducer (NFT).

HSA 110 of FIG. 1 includes a voice coil drive actuator 112. Voice coil drive actuator 112 produces a magnetic field that exerts a force on an actuator mechanism 114, causing actuator mechanism 114 to rotate about a shaft 116 in either rotational direction. Rotatable drive actuator arms 118 are mechanically coupled to actuator mechanism 114 and to each HGA 120 such that rotating actuator mechanism 114 causes rotatable drive actuator arms 118 and HGAs 120, and thus magnetic recording heads 130, to move relative to magnetic disks 108.

Figure 2:
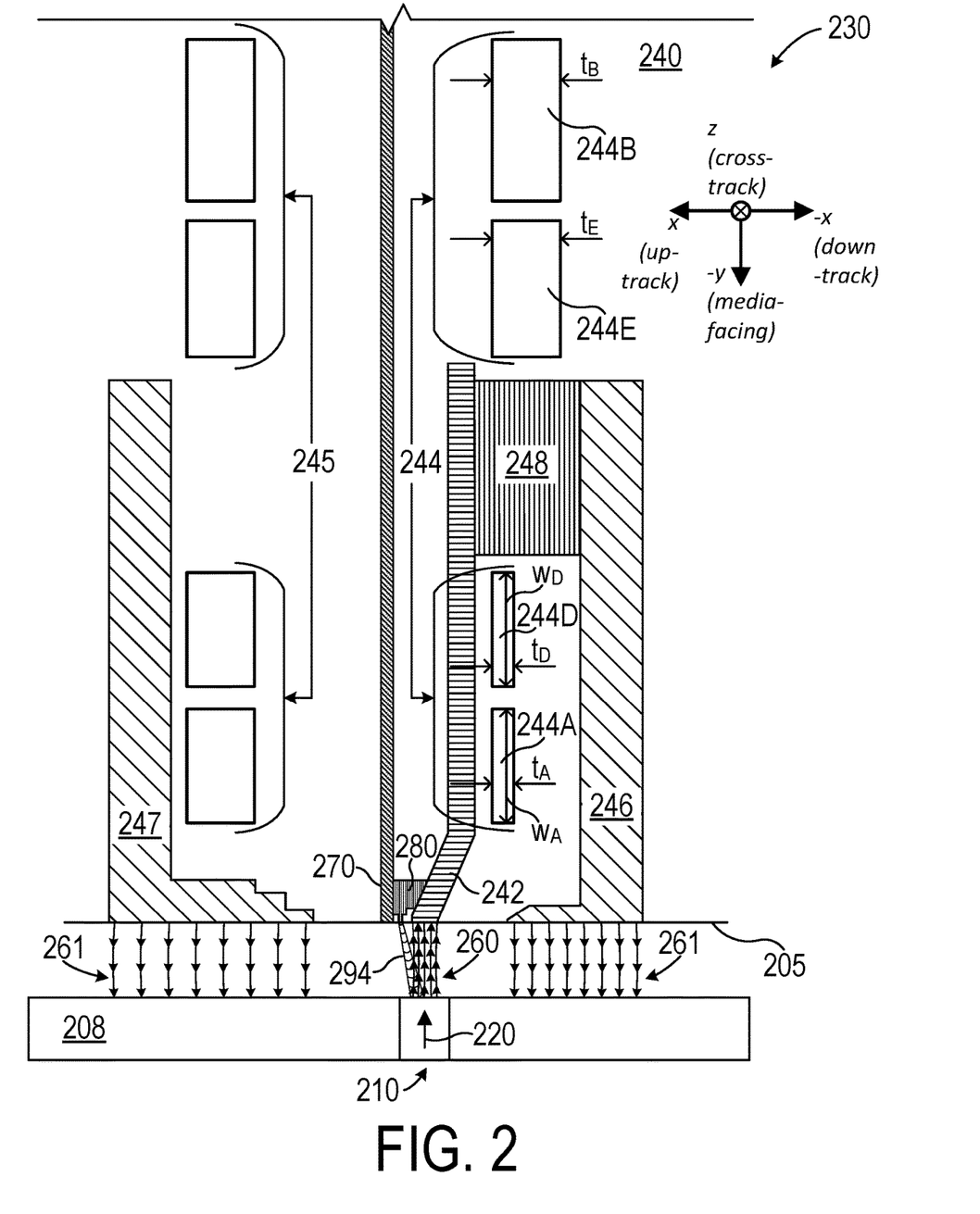
FIG. 2 is a cross-sectional view of an example writer of a magnetic recording head, in accordance with aspects of this disclosure.

FIG. 2 is a cross-sectional view of an example magnetic recording head, in accordance with aspects of this disclosure. Magnetic recording head 230 is disposed proximal to a magnetic disk 208 during read and write operations of an HDD (e.g., HDD 100 of FIG. 1). In the example of FIG. 2, a media-facing surface 205 of magnetic recording head 230 is held proximal to and faces magnetic disk 208. In some examples, media-facing surface 205 is an air-bearing surface that is configured to maintain magnetic recording head 230 at a target spacing (e.g., a head-media spacing) from a surface of magnetic disk 208 during some operations of HDD 100.

Magnetic recording head 230 includes a writer 240. Writer 240 is configured to produce a magnetic field and direct the magnetic field toward a surface of magnetic disk 208 to orient grains of magnetic disk 208 into bits of stored data. Writer 240 includes a write pole 242, a first writer coil 244 disposed in a down-track direction from write pole 242, a second writer coil 245 disposed in an up-track direction from write pole 242, return poles 246 and 247, and a magnetic via 248. Write pole 242 includes an end proximal to media-facing surface 205. In some examples, a part of write pole 242 is provided on media-facing surface 205. Return pole 246 is disposed in the down-track dimension from write pole 242. Return pole 247 is disposed in the up-track dimension from write pole 242.

A drive controller (e.g., drive controller 102 of FIG. 1) may output electrical current through first writer coil 244 and/or second writer coil 245. First writer coil 244 and second writer coil 245 are configured to carry electrical current and induce a magnetic flux in write pole 242. Write pole 242 may include magnetic materials with properties (e.g., high magnetic permeability, low magnetic coercivity) that enables write pole 242 to produce and guide magnetic flux in the presence of an inductive current (e.g., a current through writer coil 244). Examples of magnetic materials include nickel, iron, cobalt, among others. Write pole 242 is configured to direct the magnetic flux produced by first writer coil 244 and second writer coil 245 and emit a magnetic field toward a surface of magnetic disk 208. Write pole 242 emits a magnetic field that includes a focused (e.g., high flux) magnetic field 260 and an unfocused (e.g., low flux) magnetic field 261. Focused magnetic field 260 is sufficiently strong to orient grains of small areas of magnetic disk 208 into bits of data that are stored for later retrieval. A stored data bit 210 of magnetic disk 208, for example, has a magnetic moment 220 that aligns with the magnetic orientation of focused magnetic field 260. Unfocused magnetic field 261 is returned to writer 240 through return poles 246 and 247 and is then be directed back to write pole 242 through a channel such as magnetic via 248. Unfocused magnetic field 261 is not strong enough to orient grains of magnetic disk 208 under normal operating conditions. A magnetic moment 220 of stored data bit 210 and magnetic moments of other data bits may therefore be maintained for later retrieval by a reader of magnetic recording head 230.

In the example of a heat-assisted magnetic recording (HAMR) head, magnetic recording head 230 may also include a waveguide 270 and a near-field transducer (NFT) 280. Waveguide 270 is configured to direct photons from a light source (e.g., a laser) toward NFT 280. NFT 280 is disposed proximal to waveguide 270 and the end of write pole 242 near media-facing surface 205. NFT 280 is configured to generate localized surface plasmons (LSPs) through resonance coupling of photons provided by waveguide 270 with free electrons of NFT 280. NFT 280 is further configured to condense the LSPs on a region or feature of NFT 280 (e.g., a peg), amplify a near-field of the LSPs, and emit a near-field 294 to produce a hot spot on magnetic disk 208. Near-field 294 of NFT 280 and magnetic field 260 from write pole 242 are directed to be at least partially coincident on magnetic disk 208 such that a temperature increase of magnetic disk 208 that results from near-field 294 may reduce the magnetic coercivity of the grains within the hot spot and enable magnetic field 260 to orient the magnetic moments of the grains more easily, thus producing more stable bits of written data upon cooling.

In accordance with aspects of this disclosure, first writer coil 244 includes a first segment 244A and a second segment 244B. Segment 244A is disposed proximal to the end of write pole 242 that is proximal to media-facing surface 205. Segment 244A is further disposed between write pole 242 and return pole 246. Segment 244B is disposed behind segment 244A relative to media-facing surface 205 in the media-facing dimension. A thickness tB of segment 244B in the down-track dimension is greater than a thickness tA of segment 244A in the down-track dimension. In some examples, thickness tA of segment 244A is less than or equal to approximately 50 percent of thickness tB of segment 244B. In some examples, thickness tA of segment 244A is less than or equal to approximately 0.5 micron and thickness tB of segment 244B is greater than or equal to approximately 1 micron.

Writer coil 244 further includes a segment 244D and a segment 244E. Segment 244D is disposed between segment 244A and magnetic via 248 in the media-facing dimension. That is, segment 244D is disposed behind segment 244A relative to media-facing surface 205 in the media-facing dimension. Segment 244E is disposed between segment 244B and via 248 in the media facing dimension. In some examples, segment 244D has a thickness $t_D$ in the down-track dimension that is approximately equal to thickness tA of segment 244A. In some examples, segment 244D has a width $w_D$ in the media-facing dimension that is approximately equal to a width $w_A$ of segment 244A in the media-facing dimension. In some examples, segment 244E has a thickness $t_E$ in the down-track dimension that is greater than thickness tA of segment 244A. In some examples, thickness $t_E$ of segment 244E is approximately equal to thickness tB of segment 244B. In some examples, thickness tA of first segment and thickness $t_D$ of segment 244D are less than 50 percent of thickness tB of segment 244B and thickness $t_E$ of segment 244E.

High data rates in a hard disk drive require smaller bits to be written on a magnetic disk, and thus require rapid directional and magnitude switChes of the magnetic flux that is generated in and emitted from the write pole. Rise time of the current through the writer coils, that is, the time required for the current to reach steady state, must be short in order to generate fast magnetic transitions. A rapid magnetic flux change in the magnetic disk (e.g., to produce smaller bits of data) may require an overshoot current to be applied through a writer coil. That is, in order to achieve a fast rise time to reach steady-state current quickly, an initial current that exceeds the target steady-state write current may be applied through the writer coils. The overshoot current may generate excess heat around the write pole and may cause the write pole to protrude from the media-facing surface. This is known as writer induced writer protrusion, or WIWP. In some instances, this excess heat combined with heat from other sources (e.g., from an NFT in the example of a HAMR head), may lead to high and/or variable WIWP and may cause the writer to protrude too closely to or even contact a surface of the magnetic disk. Such protrusion may produce unpredictable results such as data erasure, poorly written bits, varied bit size, and damage to the magnetic recording head resulting from contact of the writer with the magnetic disk. WIWP may be controlled in part by dissipating heat with sufficiently thick coils. However, thicker coils also require more current and may require larger overshoot current to rapidly produce a magnetic flux in the write pole, and the effectiveness of thicker coils in mitigating heat and WIWP may be limited.

Providing a writer coil 244 that includes one or more thin segments (e.g., segment 244A, segment 244D) in proximity to the end of write pole 242 and one or more thick segments (e.g., segment 244B, segment 244E) distal to the end of write pole 242 may enable smaller bits of data on magnetic disk 208 and/or may provide better heat management than a writer coil with a uniform thickness. A writer coil 244 that is thin near write pole 242 (e.g., segments 244A and 244D) may enable a higher magnitude of magnetic field, and thus faster switching of magnetization, in write pole 242 without the need for a large overshoot current to be applied to writer coil 244 in order to generate a desired magnetization switch in write pole 242. Faster magnetic switching in write pole 242 may decrease the size of written bits on magnetic disk 208 and may enable higher ADC of HDD 100. Reducing or eliminating the need for a large overshoot current to be applied to writer coil 244 in order to produce a rapid magnetization change in write pole 242 may provide a lower and/or more controllable WIWP. Additionally, reducing or eliminating the overshoot current may reduce the heat generated near write pole 242 and may reduce the WIWP. A writer coil 244 that is thick distal to write pole 242 (e.g., segments 244B and 244E) may provide better heat sinking and may enable segment 244B and segment 244E to dissipate heat more effectively, potentially further reduce the WIWP. Segments 244B and 244E may be made even thicker than a writer coil of uniform thickness because, in contrast to segments of write coil 244 that are proximal to write pole 242 (e.g., segment 244A, segment 244D), current response of segments of writer coil 244 that are distal to write pole 242 have less impact on the rate of magnetic flux generated in write pole 242. That is, writer coil 244 may provide a benefit of fast magnetic flux transitions by having thin segments (e.g., segments 244A and 244D) near write pole 242 and may provide a benefit of heat and WIWP mitigation by having thick segments (e.g., segments 244B and 244E) distal to write pole 242.

Figure 3:
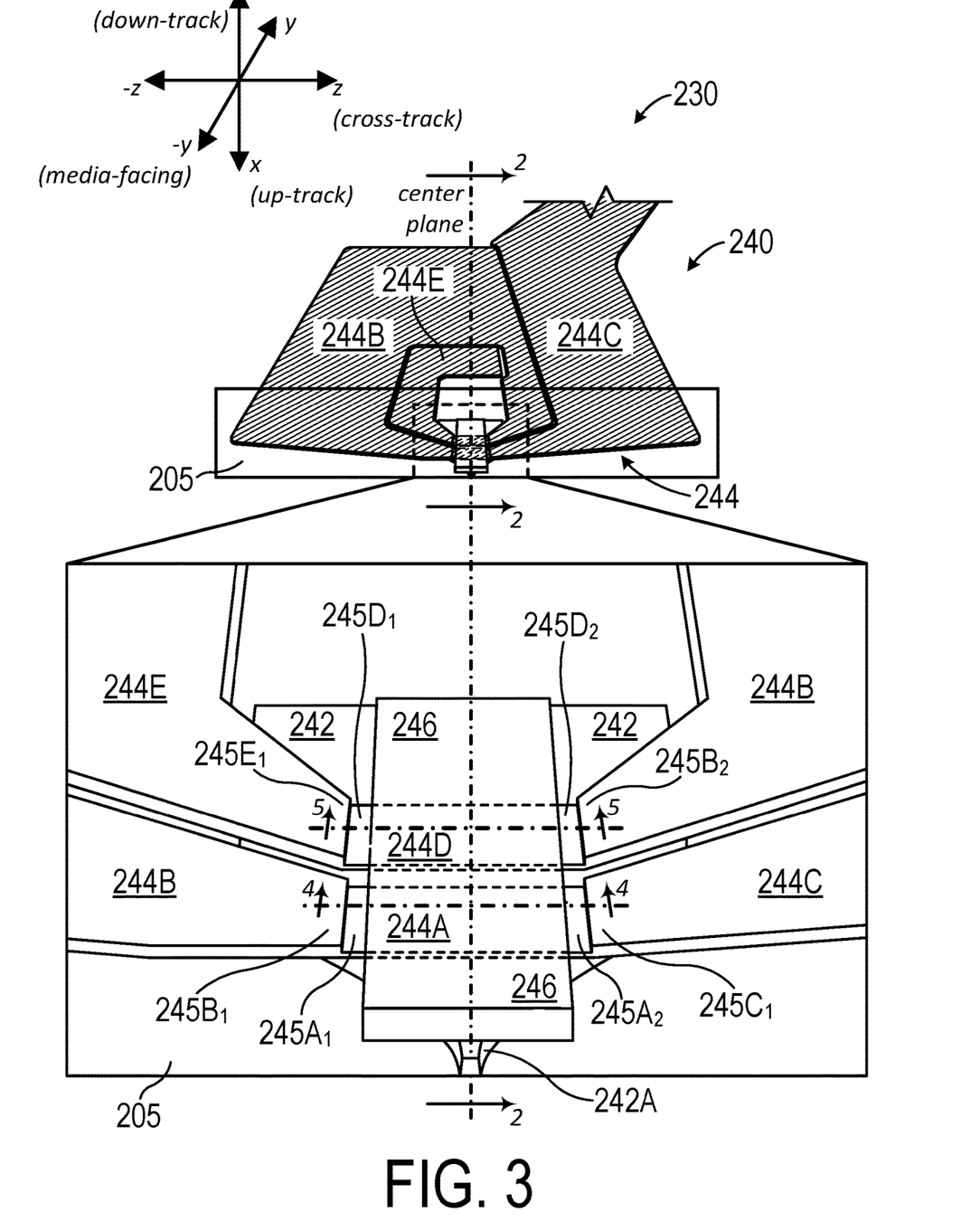
FIG. 3 is a perspective view of an example writer, in accordance with aspects of this disclosure.

FIG. 3 is a perspective view of an example writer, in accordance with aspects of this disclosure. FIG. 3 is be a perspective view of magnetic recording head 230 of FIG. 2, with the view of the section of magnetic recording head 230 illustrated in FIG. 2 indicated by the line 2-2 of FIG. 3 facing in the direction of the arrows. Writer coil 244 includes a first segment 244A, a second segment 244B, a third segment 244C, a fourth segment 244D, and a fifth segment 244E.

First segment 244A is disposed proximal to an end of write pole 242 that is proximal to a media-facing surface 205 of magnetic recording head 230. First segment 244A is further disposed between write pole 242 and return pole 246 in a down-track dimension of magnetic recording head 230. First segment 244A is elongated and oriented substantially orthogonal to the down-track dimension, substantially parallel to a cross-track dimension of magnetic recording head 230, and substantially orthogonal to a media-facing dimension of the magnetic recording head 230.

First segment 244A includes a first end $245A_1$ and a second end $245A_2$. In some examples, first end $245A_1$ and second end $245A_2$ of first segment 244A are approximately equidistant but in opposite directions from a center of first segment 244A in the cross-track dimension. In the example of FIG. 3, the center of first segment 244A is defined by a center plane. The center plane is substantially orthogonal to media-facing surface 205. The center plane of this example divides first segment 244A and write pole 242 into halves. Center plane of FIG. 3 is coincident with section hatching 2 that depicts the orientation of the view shown in FIG. 2.

Second segment 244B is electrically coupled to first segment 244A. In some examples, a first end $244B_1$ of second segment 244B is electrically coupled to first end $244A_1$ of first segment 244A. In the example of writer coil 244 of FIG. 3, first segment 244A and second segment 244B are oriented substantially parallel to a coil plane that is defined by the media-facing dimension and the cross-track dimension (a y-z plane). That is, the coil plane is substantially orthogonal to the center plane and is substantially orthogonal to media-facing surface 205. Second segment 244B is distal to the end of write pole 242 relative to first segment 244A in coordinates defined by the coil plane. In some examples, an area defined by second segment 244B in the coil plane is greater than an area defined by first segment 244A in the coil plane.

Third segment 244C includes an end $244C_1$ that is electrically coupled to second end $244A_2$ of first segment 244A. Third segment 244C is oriented substantially parallel to the coil plane. Third segment 244C is distal to the end of write pole 242 relative to first segment 244A in coordinates defined by the coil plane. In some examples, an area defined by third segment 244C in the coil plane is greater than the area defined by first segment 244A in the coil plane. In the example of FIG. 3, first segment 244A, second segment 244B, and third segment 244C are oriented in a substantially circumferential arrangement to enable a current passed through writer coil 244 to induce a magnetic flux in write pole 242.

In some examples, fourth segment 244D of writer coil 244 has a thickness in the down-track dimension, a length in the cross-track dimension, and a width in the media-facing dimension that are approximately equal to the thickness, a respective length, and a respective width of first segment 244A. Fourth segment 244D may be oriented to be substantially parallel to first segment 244A. Fourth segment 244D may be disposed at a position that is substantially the same as a position of first segment 244A relative to the cross-track dimension and the down-track dimension. Fourth segment 244D is disposed behind first segment 244A relative to media-facing surface 205 in the media-facing dimension.

Fourth segment 244D includes a first end $244D_1$ and a second end $244D_2$. In some examples, first end $244D_1$ of fourth segment 244D is at a position that is substantially the same as a position of first end $244A_1$ of first segment 244A in the cross-track dimension. In some examples, second end $244D_2$ of fourth segment 244D is at a position that is substantially the same as a position of second end $244A_2$ of first segment 244A in the cross track-dimension. An end $244E_1$ of fifth segment 244E is electrically coupled to first end $244D_1$ of fourth segment 244D. A second end $244B_2$ of second segment 244B is electrically coupled to second end $244D_2$ of fourth segment 244D.

In some examples, first segment 244A, second segment 244B, third segment 244C, fourth segment 244D, and fifth segment 244E are oriented substantially parallel to the coil plane. Second segment 244B, third segment 244C, and fifth segment 244E are distal to the end of write pole 242 relative to first segment 244A in coordinates defined by the coil plane. In some examples, an area defined by fifth segment 244E in the coil plane is greater than the area defined by first segment 244A in the coil plane. In the example of writer coil 244 of FIG. 3, first segment 244A, second segment 244B, third segment 244C, fourth segment 244D, and fifth segment 244E are oriented in a substantially circumferential arrangement to enable a current passed through writer coil 244 to induce a magnetic flux in write pole 242.

Figure 4:
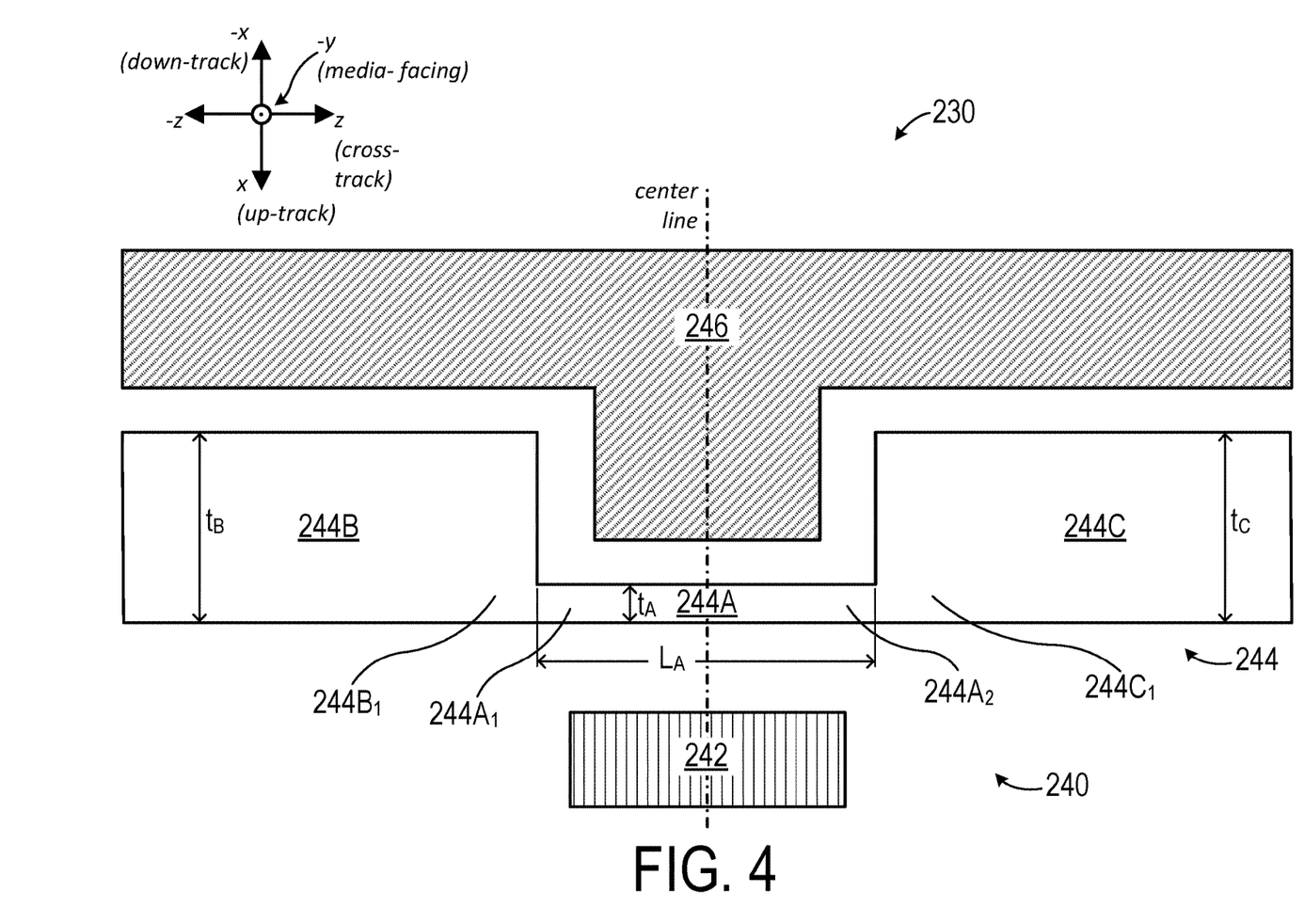
FIG. 4 is a cross-sectional view of an example writer, in accordance with aspects of this disclosure.

FIG. 4 is a cross-sectional view of an example writer of a magnetic recording head, in accordance with aspects of this disclosure. FIG. 4 illustrates a section of magnetic recording head 230 of FIG. 3 as viewed along the line 4-4 in the direction of the arrows.

In the example of FIG. 4, the center of segment 244A is defined by a center line. In some examples, the center line of FIG. 4 may lie in the center plane of FIG. 3. The center line is substantially parallel to the down-track dimension, substantially orthogonal to the media-facing dimension, and substantially orthogonal to the cross-track dimension. The center line of this example divides segment 244A, write pole 242, and return pole 246 into halves.

Segment 244A has a thickness tA in the down-track dimension and a length LA in the cross-track dimension. A thickness tB of segment 244B in the down-track dimension is greater than thickness tA of segment 244A. In some examples, thickness tA of segment 244A is less than or equal to approximately 50 percent of thickness tB of segment 244B. In some examples, thickness tA of segment 244A is less than or equal to approximately 0.5 micron and thickness tB of segment 244B is greater than or equal to approximately 1 micron.

A thickness $t_C$ of segment 244C in the down-track dimension is greater than thickness tA of segment 244A. In some examples, thickness tA of segment 244A is less than or equal to approximately 50 percent of thickness $t_C$ of segment 244C. In some examples, thickness tA of segment 244A is less than or equal to approximately 0.5 micron and thickness $t_C$ of segment 244C is greater than or equal to approximately 1 micron. In some examples, thickness $t_C$ of segment 244C is similar to thickness tB of segment 244B.

Figure 5:
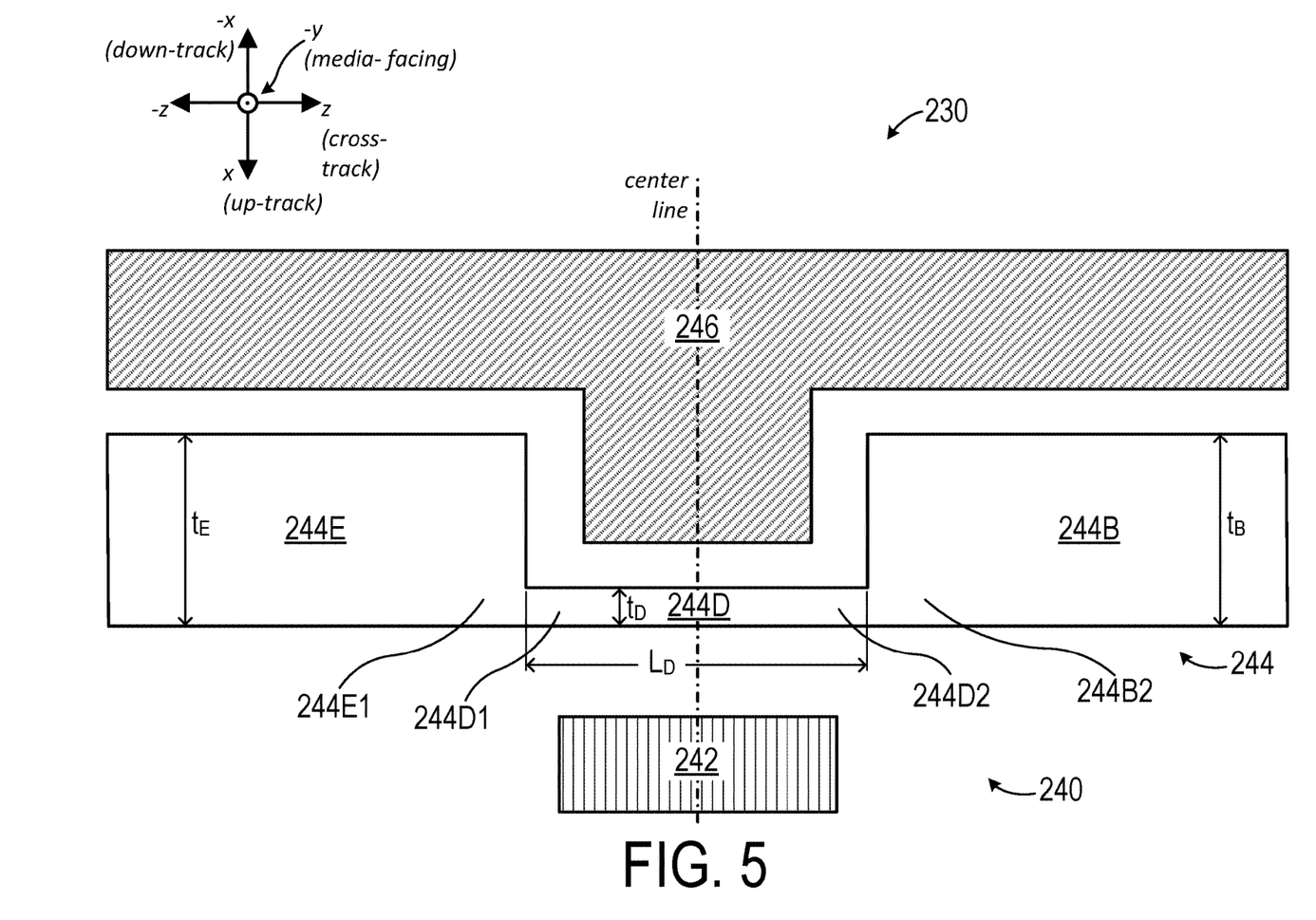
FIG. 5 is a cross-sectional view of an example writer, in accordance with aspects of this disclosure.

FIG. 5 is a cross-sectional view of an example writer of a magnetic recording head, in accordance with aspects of this disclosure. FIG. 5 illustrates a view section of magnetic recording head 230 of FIG. 3 as viewed along the line 5-5 in the direction of the arrows. FIG. 5 is a view of magnetic recording head 230 of FIG. 4, where the section of magnetic recording head 230 shown in FIG. 5 is behind the section of magnetic recording head 230 shown in FIG. 4 relative to a media-facing dimension (−γ) of magnetic recording head 230.

Segment 244D has a thickness $t_D$ in the down-track dimension and a length LD in the cross-track dimension. In some examples, thickness tD of segment 244D is approximately equal to thickness tA of segment of 244A of FIG. 4. In some examples, length LD of segment 244D is approximately equal to length LA of segment of 244A of FIG. 4. A thickness $t_E$ of segment 244E in the down-track dimension is greater than thickness $t_D$ of segment 244D. In some examples, thickness $t_D$ of segment 244D is less than or equal to 50 percent of thickness $t_E$ of segment 244E. In some examples, thickness $t_D$ of segment 244D is less than or equal to approximately 0.5 micron and thickness $t_E$ of segment 244E is greater than or equal to approximately 1 micron.

A thickness tB of segment 244B in the down-track dimension is greater than thickness tB of segment 244A. In some examples, thickness $t_D$ of segment 244D is less than or equal to approximately 50 percent of thickness tB of segment 244B. In some examples, thickness $t_D$ of segment 244D is less than or equal to approximately 0.5 micron and thickness tB of segment 244B is greater than or equal to approximately 1 micron. In some examples, thickness tB of segment 244B is similar to thickness $t_E$ of segment 244E. In some examples, thickness tB of segment 244B is similar to thickness tB of segment 244B of FIG. 4.

What is claimed is:

1. A magnetic recording head comprising:
   a write pole comprising an end proximal to a media-facing surface of the magnetic recording head;
   a return pole disposed a distance from the write pole in a down-track dimension of the magnetic recording head; and
   a writer coil configured to produce a magnetic flux in the write pole, the writer coil comprising:
      a first segment disposed proximal to the end of the write pole and between the write pole and the return pole, the first segment comprising a first end and a second end;
      a second segment; and
      a third segment,
      wherein an end of the second segment is electrically coupled to the first end of the first segment,
      wherein an end of the third segment is electrically coupled to the second end of the first segment,
      wherein a thickness of the second segment in the down-track dimension is greater than a thickness of the first segment in the down-track dimension, and
      wherein a thickness of the third segment in the down-track dimension is greater than the thickness of the first segment in the down-track dimension.

2. The magnetic recording head of claim 1, wherein the first segment is elongated and oriented substantially orthogonal to the down-track dimension, substantially parallel to a cross-track dimension of the magnetic recording head, and substantially orthogonal to a media-facing dimension of the magnetic recording head.

3. The magnetic recording head of claim 1,
   wherein the first segment and the second segment are oriented substantially parallel to a plane that is defined by a media-facing dimension of the magnetic recording head and a cross-track dimension of the magnetic recording head, and
   wherein the second segment is distal to the end of the write pole relative to the first segment in coordinates defined by the plane.

4. The magnetic recording head of claim 3, wherein an area defined by the second segment in the plane is greater than an area defined by the first segment in the plane.

5. The magnetic recording head of claim 1, wherein the thickness of the first segment is less than or equal to 50 percent of the thickness of the second segment.

6. The magnetic recording head of claim 1,
   wherein the thickness of the first segment is less than or equal to 0.5 micron, and
   wherein the thickness of the second segment is greater than or equal to 1 micron.

7. The magnetic recording head of claim 1,
   wherein the first end the and the second end of the first segment are approximately equidistant but in opposite directions from a center of the first segment in a cross-track dimension of the magnetic recording head,
   the center of the first segment defined by a center plane,
   wherein the center plane is substantially parallel to a plane defined by a media-facing dimension of the magnetic recording head and a down-track dimension of the magnetic recording head, and
   wherein the center plane divides the first segment and the write pole into halves.

8. The magnetic recording head of claim 1,
wherein the first segment, the second segment, and the third segment are oriented substantially parallel to a plane that is defined by a media-facing dimension of the magnetic recording head and a cross-track dimension of the magnetic recording head, and
wherein the second segment and the third segment are distal to the end of the write pole relative to the first segment in coordinates defined by the plane.

9. The magnetic recording head of claim 8,
wherein an area defined by the second segment in the plane is greater than an area defined by the first segment in the plane, and
wherein an area defined by the third segment in the plane is greater than the area defined by the first segment in the plane.

10. The magnetic recording head of claim 1, wherein the first segment, the second segment, and the third segment are oriented in a substantially circumferential arrangement to enable a current passed through the writer coil to induce a magnetic flux in the write pole.

11. The magnetic recording head of claim 1, wherein the writer coil further comprises a fourth segment having a thickness in the down-track dimension, a length in a cross-track dimension of the magnetic recording head, and a width in a media-facing dimension of the magnetic recording head that are approximately equal to the thickness, a respective length, and a respective width of the first segment.

12. The magnetic recording head of claim 11,
wherein the fourth segment is oriented to be substantially parallel to the first segment,
wherein the fourth segment is disposed at a position that is substantially the same as a position of the first segment relative to the cross-track dimension and the down-track dimension, and
wherein the fourth segment is disposed behind the first segment relative to the media-facing surface in the media-facing dimension.

13. The magnetic recording head of claim 11,
wherein the fourth segment comprises a first end and a second end,
wherein the first end of the fourth segment is at a position that is substantially the same as a position of the first end of the first segment in the cross-track dimension,
wherein the second end of the fourth segment is at a position that is substantially the same as a position of the second end of the first segment in the cross track-dimension,
wherein the end of the second segment is a first end of the second segment, and
wherein a second end of the second segment is electrically coupled to the second end of the fourth segment.

14. The magnetic recording head of claim 13,
wherein the writer coil further comprises a fifth segment having a thickness in the down-track dimension that is greater than the thickness of the first segment, and
wherein an end of the fifth segment is electrically coupled to the first end of the fourth segment.

15. The magnetic recording head of claim 14,
wherein the first segment, the second segment, the third segment, the fourth segment, and the fifth segment are oriented substantially parallel to a plane that is defined by a media-facing dimension of the magnetic recording head and a cross-track dimension of the magnetic recording head, and
wherein the second segment, the third segment, and the fifth segment are distal to the end of the write pole relative to the first segment in coordinates defined by the plane.

16. The magnetic recording head of claim 15,
wherein an area defined by the second segment in the plane is greater than an area defined by the first segment in the plane,
wherein an area defined by the third segment in the plane is greater than the area defined by the first segment in the plane, and
wherein an area defined by the fifth segment in the plane is greater than an area defined by the first segment in the plane.

17. The magnetic recording head of claim 14, wherein the first segment, the second segment, the third segment, the fourth segment, and the fifth segment are oriented in a substantially circumferential arrangement to enable a current passed through the writer coil to induce a magnetic flux in the write pole.

18. The magnetic recording head of claim 14,
wherein the thicknesses of the first and fourth segments are less than or equal to 50 percent of the thickness of the second segment, the third segment, and the fifth segment.

19. A magnetic recording head comprising:
a write pole comprising an end proximal to a media-facing surface of the magnetic recording head;
a return pole disposed a distance from the write pole in a down-track dimension of the magnetic recording head; and
a writer coil configured to produce a magnetic flux in the write pole, the writer coil comprising:
a first segment disposed proximal to the end of the write pole and between the write pole and the return pole, the first segment comprising a first end and a second end;
a second segment comprising a first end and a second end;
a third segment; and
a fourth segment comprising a first end and a second end;
wherein the first end of the second segment is electrically coupled to the first end of the first segment,
wherein an end of the third segment is electrically coupled to the second end of the first segment,
wherein the second end of the second segment is electrically coupled to the second end of the fourth segment,
wherein the fourth segment is disposed at a position that is substantially the same as a position of the first segment relative to a cross-track dimension and the down-track dimension,
wherein the fourth segment is disposed behind the first segment relative to the media-facing surface in a media-facing dimension,
wherein a thickness of the second segment in the down-track dimension is greater than a thickness of the first segment in the down-track dimension, and
wherein a thickness of the third segment in the down-track dimension is greater than the thickness of the first segment in the down-track dimension, and
wherein the fourth segment has a thickness in the down-track dimension, a length in the cross-track dimension of the magnetic recording head, and the width in the media-facing dimension of the magnetic recording head that are approximately equal to the thickness, a respective length, and a respective width of the first segment.

20. The magnetic recording head of claim 19,
wherein the writer coil further comprises a fifth segment having a thickness in the down-track dimension that is greater than the thickness of the first segment, and
wherein an end of the fifth segment is electrically coupled to the first end of the fourth segment.

* * * * *